United States Patent [19]

Hollstein et al.

[11] Patent Number: 5,780,383
[45] Date of Patent: *Jul. 14, 1998

[54] SOLID SUPERACID CATALYST COMPRISING GROUP VII METAL AND HAVING $H_O$ LESS THAN −18

[75] Inventors: Elmer J. Hollstein, Wilmington, Del.; James T. Wei, Ridgewood, N.J.; Chao-Yang Hsu, Media, Pa.

[73] Assignee: Sun Company, Inc. (R&M), Philadelphia, Pa.

[ * ] Notice: The portion of the term of this patent subsequent to Apr. 17, 2007, has been disclaimed.

[21] Appl. No.: 989,729

[22] Filed: Dec. 10, 1992

Related U.S. Application Data

[63] Continuation of Ser. No. 686,713, Apr. 17, 1991, abandoned, which is a continuation-in-part of Ser. No. 565,588, Aug. 9, 1990, abandoned.

[51] Int. Cl.$^6$ .............. B01J 23/32; B01J 27/053; C01B 17/74
[52] U.S. Cl. ................ 502/324; 502/217; 423/532
[58] Field of Search .................. 423/532, 481; 502/221, 241, 339, 222, 324, 217

[56] References Cited

U.S. PATENT DOCUMENTS

| | | | |
|---|---|---|---|
| 3,363,398 | 1/1968 | Wheatcroft et al. | 423/532 |
| 4,138,368 | 2/1979 | Kiyomiya et al. | |
| 4,347,399 | 8/1982 | Rice | 585/738 |
| 4,402,869 | 9/1983 | Tauster et al. | |
| 4,407,729 | 10/1983 | Schumacher et al. | 502/221 |
| 4,581,126 | 4/1986 | Day et al. | 208/138 |
| 4,619,910 | 10/1986 | Dyer et al. | 502/336 |
| 4,650,781 | 3/1987 | Jones et al. | 502/241 |
| 4,666,632 | 5/1987 | Goliaszewski et al. | 260/369 |
| 4,703,031 | 10/1987 | Unmuth et al. | 502/339 |
| 4,918,041 | 4/1990 | Hollstein et al. | 502/217 |
| 4,935,212 | 6/1990 | Jacob | 423/481 |
| 5,036,035 | 7/1991 | Baba et al. | 502/221 |

FOREIGN PATENT DOCUMENTS

| | | | |
|---|---|---|---|
| 56-33033 | 4/1981 | Japan | 502/221 |
| 56-33037 | 4/1981 | Japan | 502/221 |
| 01245853 | 10/1989 | Japan | B01J 27/083 |

OTHER PUBLICATIONS

Hino et al. "Synthesis of Solid Superacid of Tungsten Oxide Supported on Zirconia and Its Catalytic Action for Reactions of Butane and Pentane" J. Chem. Soc. Chem. Commun. 1988 pp. 1259–1260.

Hino et al., "Synthesis of Solid Superacid Catalyst with Acid Strength of $H_o<-16.04$" J.C.S. Chem. Comm. 1980 pp. 851–852.

Primary Examiner—Glenn Caldarola
Attorney, Agent, or Firm—Stephen T. Falk

[57] ABSTRACT

The invention is a solid catalyst having acid strength $H_o$ less than −18. Such catalysts are characterized by the ability to react with very weak bases, such as butane, at relatively low temperatures, for example temperatures in the range from 20° to 200° C. The catalysts have exceptionally high activity for various hydrocarbon conversion processes, for example, because of their exceptionally high acid strength.

2 Claims, No Drawings

SOLID SUPERACID CATALYST COMPRISING GROUP VII METAL AND HAVING $H_O$ LESS THAN −18

CROSS REFERENCE TO RELATED APPLICATION

This is a continuation of Ser. No. 07/686713 filed on Apr. 17, 1991, now abandoned, which is a continuation-in-part of application Ser. No. 07/565,588, filed Aug. 9, 1990, now abandoned, in the name of Elmer J. Hollstein, James T. Wei and Chao-Yang Hsu.

BACKGROUND OF THE INVENTION

This invention relates to novel catalysts suitable, inter alia, for various hydrocarbon conversions including isomerization of $C_4$ to $C_7$ acyclic hydrocarbons, alkylation of alkanes and alkylation of aromatics, dehydrogenation or partial oxidation of hydrocarbons and the conversion of alkenes and alcohols to ethers such as methyl tertiary butyl ether.

The catalyst used according to the invention is a solid, strongly acidic material. Solid, very strongly acidic materials suitable for catalyzing hydrocarbon reactions, for example the isomerization of n-butane and alkylation, have been prepared in the prior art by treatment of zirconium oxides with sulfate ion or sulfuric acid, for example 1N sulfuric acid, and calcining the product at 500° C. for three hours. However, these prior catalysts are believed to be less strongly acidic than the catalysts according to the present invention. Such prior catalysts are disclosed in Hino, et al, "Reactions of Butane and Isobutane Catalyzed by Zirconium Oxide Treated with Sulfate Ion", *Journal of the American Chemical Society*, Oct. 10, 1979, pages 3469–31. Solid superacids suitable for catalyzing skeletal isomerizations of butane and isobutane have been prepared by exposing $H_4TiO_4$ to 1N sulfuric acid and calcining in air at 500° C., as disclosed in Hino et al, "Reactions of Butane and Isobutane Catalyzed by Titanium Oxide Treated with Sulphate Ion", *J.S.C. Chem Comm.*, 1979, pages 1148–9. Hino et al, "Synthesis of Solid Superacid Catalyst with Acid Strength of $H_o$—16.04" disclose a preparation similar to that in reference (1) above, wherein $Zr(OH)_4$ obtained from different sources was calcined at temperatures up to 650° C., and found suitable for reactions of butane in a recirculation reactor at 25° C.

In Ito et al, Japanese Patent No. 61,242,641, solid acid catalysts for butane alkylation are prepared by impregnating sulfate-containing materials and rare earth metals or their compounds or supports consisting of Group IV metal hydroxides or oxides, followed by calcination and stabilization. Powdered $Zr(OH)_4$ supports were impregnated with lanthanum nitrate, dried, calcined at 300° C. treated with sulfuric acid, dried and calcined at 550° C. for 3 hours.

In Japanese patent publication 87-344276/49, a solid superacid catalyst was prepared by impregnating a carrier comprising the hydroxide or oxide of a Group III or Group IV metal with a Group VIII metal (the abstract refers to Group VII, but the examples given are of Group VIII metals), for use in producing lower paraffin hydrocarbons from shale oil.

In *Chemical Week*, Nov. 25, 1987, the treatment of zirconium, titanium and iron oxides with sulfuric acids to produce "sulfated" in organic oxides that show superior catalytic activity for alkylation of ortho-xylene by styrene, is disclosed.

In Baba, et al, Japanese Patent No. 61-2633932, Nov. 21, 1986, filed May 17, 1985, hydrocarbons are isomerized at reaction temperature below 400° C. using a catalyst obtained by impregnating Group VIII metals, e.g. nickel, platinum, ruthenium, rhodium, palladium, osmium or iridium, and sulfate ion or precursor thereof in a carrier made of Group IV metals, e.g. titanium, zirconium, hafnium, silicon, germanium or tin, and/or hydroxide or oxide of Group III metals, e.g. aluminum, gallium, indium and thallium, and stabilizing by roasting at 450°–800° C. for 5 to 16 hours.

In Veda, et al, Japanese Patent No. 62-246993, filed Apr. 2, 1986, paraffin hydrocarbons are thermally cracked at 150°–350° C. and over 50 atmospheres hydrogen pressure in the presence of a solid, ultra strongly acidic catalyst made by treating hydroxides or impregnating a Group VIII metal, e.g. nickel, platinum, ruthenium, rhodium, palladium, osmium or iridium, on a supporting body of a hydroxide or oxide of Group III or Group IV metals, e.g. titanium, zirconium, silicon, germanium, tin, aluminum, gallium or indium, followed by treating with sulfuric acid and roasting to stabilize the catalyst.

The latter two references indicate that addition of Group VIII metal improves the catalytic activities of the solid superacids and that these solid superacids are suitable for isomerization of alkanes and xylenes, and cracking of shale oil or coal to light paraffins.

A solid superacid catalyst reported by K. Arata, et al, *J. Amer. Chem. Soc.*, 101,6439 (1979), a sulfuric acid treated zirconium oxide, isomerized n-butane at 100° to 250° C., but the n-butane isomerization below 100° C. is negligible.

In U.S. Pat. Nos. 4,918,041, and 4,956,519, to the present inventors Hollstein et al, a sulfated and calcined catalyst contains (1) oxide or hydroxide of Group III or Group IV, e.g. zirconium, element, (2) oxide or hydroxide of Group V, Group VI or Group VII, e.g. manganese, metal and (3) oxide or hydroxide of Group VIII, e.g. iron, metal. The catalyst is disclosed as useful in the isomerization of normal alkanes having 4 to 7 carbon atoms per molecule, in alkylation of alkanes and alkylation of aromatics, dehydrogenation or partial oxidation of hydrocarbons and the conversion of alkenes and alcohols to ethers such as methyl tertiary butyl ether.

In Wen, et al, "Hydroisomerization and Hydrocracking of n-Heptane and n-Hexadecane on Solid Superacids", *Energy & Fuels*, 1990, 4,372–379, n-heptane and n-hexadecane are hydroisomerized and hydrocracked on a platinum-doped solid superacid, $Pt/ZrO_2/SO4^{-2}$, at 130°–170° C., 300 psig initial hydrogen pressure and 15–75 minutes reaction time. $Pt/HfO_2/SO_4^{-2}$ and $Pt/ZrO_2/HfO_2/SO_3^{-2}$ catalysts are also prepared and used in the reactions.

In (13) Baba, et al, European Patent Application 85-306434.3, filed Sep. 10, 1985, published Mar. 19, 1986, publication number 0 174 836, solid strong acid catalysts in which sulfate and Group VIII metals are supported on hydroxides or oxides of Group III and/or Group IV metals, are disclosed as catalysts useful for hydrocarbon reactions such as isomerization of paraffinic hydrocarbons, isomerization of cyclic compounds and isomerization of aromatic compounds, cracking of n-pentane and alkylation of isobutane and butene-2.

In Hatakeyama, et al, Japanese Kokai Patent SHO 61-183230, Aug. 15, 1986, from application No. SHO 60-23610 filed Feb. 12, 1985, fractions rich in 2,2,3-trimethylpentane are produced by alkylation of C4 hydrocarbons using a solid zirconia catalyst having acid strength ($H_o$) greater than −10.6, obtained by contacting zirconium hydroxide or oxigde with a solution containing sulfate root.

In Japanese patent J01245853, issued to Keishitsu Ryubun Shi Oct. 2, 1989, as reported in Derwent On-line Abstract no. 89-329274/45, a solid catalyst used for isobutane alkylation with olefin is disclosed, with a support material made of Group III and/or Group IV metal hydroxides or oxides, and containing Group IIb, Va, VIa, VIIa metals or its compounds, and $SO_4$ salts or $SO_4^{-2}$ containing precursors. Examples of Group III metals given are aluminum, gallium, indium or thallium; of Group IV metals, titanium, zirconium, hafnium, silicon, germanium or tin; of Group IIb metals, zinc, cadmium or mercury; of Group Va (sic) metals, vanadium, niobium or tantalum; of Group VIa (sic) metals manganese or rhenium.

In Ito, et al. Japanese Kokai Patent, SHO 61-242641, Oct. 28, 1956, application SHo 60-84515 filed Apr. 22, 1985, a solid acidic catalyst for alkylation of isoparaffin with olefin is disclosed. The catalyst is obtained by adding a rare earth element or its compounds, and sulfate root or its precursor to a supporting member made of hydroxide or oxide of Group IV metals, followed by sintering at 400°–800° C. for stabilization. Hydroxide or oxide of at least one type of metals chosen from titanium, zirconium, hafnium, silicon, germanium and tin is used, and particularly hydroxide or oxide of zirconium or titanium is preferred. Tantalum and cerium or their compounds are disclosed as most desirable rare earths; praseodymium, neodymium, samarium and gadolinium are also disclosed.

SUMMARY OF THE INVENTION

The catalyst of the present invention is a solid, strongly acidic material having acid strength Ho of less than −18. Preferred catalysts according to the invention are sulfated and calcined solid metal oxides or hydroxides having such acid strength.

DETAILED DESCRIPTION OF THE INVENTION

The catalysts according to the invention are characterized, because of their exceptionally high acid strength, by the ability to react with very weak bases such as butane at relatively low temperatures, for example temperatures in the range from 20° C. to 200° C.

The greater the strength of an acid, the lower the parameter $H_o$. Therefore, an acid having $H_o$ of −18 is a stronger acid than an acid having $H_o$ of −12. 100 percent sulfuric acid for example, has an acid strength Ho of −12. Prior art solid superacid catalysts have acid strengths less than −12, and ranging down to −18. The catalyst present of the invention has acid strength $H_o$ of less than −18. Such acid strengths may be determined by reference to the following table, which shows the relationship between acid strength and rate of reaction of the acid with a weak base, n-butane, at a temperature of 90° C., the units of the rate being percent conversion of butane per pass.

Following is a description of the manner of measuring that rate: A reactor tube is packed with 5 milliliters of catalyst and fitted for reactant up-flow in a thermostated system. Liquid butane is fed to the reactor at a rate of 5.0 milliliters per hour. A pressure of 400 psig is maintained. The reactants are led to a gas chromatograph and analyzed. The percent conversion per pass of butane at 90° is used as a measure of reactant rate.

| Acid Strength ($H_o$) | Reaction Rate* |
|---|---|
| −12 | 0 |
| −16 | 0.6 |
| <−18 | 65.0 |

Preferred reaction rates of catalysts according to the invention are in the range from 50 to 70.

*Reaction rate equals percent conversion per pass of butane @ 90° C., using a fixed bed up-flow reactor containing five (f) milliliters of catalyst. Butane feed rate: LHSV= 1.0; Reaction pressure: 400 psig.

A preferred catalyst according to the invention comprises or consists of a sulfated, very strongly acidic catalyst which contains, in addition to oxide or hydroxide of Group III or Group IV element and Group VIII, metal, oxide or hydroxide of a Group V or Group VI or Group VII metal.

Preferred catalysts according to the invention comprise a sulfated and calcined solid mixture of (1) oxide or hydroxide of metal from a first class consisting of Group III and Group IV metals, (2) oxide or hydroxide from a second class consisting of Group V, Group VI or Group VII metal and (3) oxide or hydroxide of Group VIII metal. The weight ratio of metal from the second class to Group VIII metal is preferably in the range from 0.1:1 to 2.0:0.1, more preferably 0.2:1 to 1.0:0.1. The catalyst preferably contains a major amount of oxide or hydroxide of metal from the first class and a minor amount, preferably in the range from 0.02 to 15.0 weight percent, more preferably 0.1 to 4.5 weight percent, of total metal from the second class and Group VIII metal.

The carrier or support for the above preferred catalyst according to the invention is an oxide or hydroxide of a Group III or Group IV element. Examples of suitable such elements are aluminum, gallium, indium, thallium, titanium, zirconium, hafnium, silicon, germanium, tin and lead. Preferred are silicon, aluminum, zirconium and mixtures of two or more thereof.

Metals from Groups V, VI or VII which can be used according to this embodiment of the invention include arsenic, antimony, bismuth, vanadium, niobium, tantalum, selenium, tellurium, chromium, molybdenum, tungsten, manganese and rhenium and mixtures of two or more thereof.

Metals from Group VIII which can be used include iron, cobalt, nickel, ruthenium, rhodium, palladium, osmium, iridium and platinum and mixtures of two or more thereof.

Examples of solid superacids according to the invention are catalysts having acid strength $H_o$ less than −18 and comprising sulfated zirconia, sulfated titania, sulfated iron oxide, sulfated zirconia containing one or more metals, sulfated titania and one or more metals, sulfated iron oxide and one or more other metals, sulfated-halogenated alumina (such as fluorinated $Al2O_3$, etc.), and a mixture of tungstate oxide and zirconia calcined at greater than or equal to 800° C., etc. Other types of solid superacids which may be used according to the invention are those comprising strong Lewis acids such as $SbF_5$, $SbCl_5$, $SbF_5/HF$, on a solid support such as silica, alumina or zirconia or combinations thereof. However, any chemical structure which provides the exceptionally high acid strength of the catalysts according to the invention may be used.

The catalysts according to the invention may be prepared for example by impregnating a support of a Group III or Group IV metal oxide or hydroxide with an aqueous or an organic solution containing compounds of Group VII and Group VIII metals. Alternatively the support can be impregnated separately with a solution of a Group VII metal compound and a solution of a Group VIII metal compound.

The catalysts according to the invention may also be prepared by co-precipitation of solid hydroxides of (1) Group III or Group IV metals, (2) Group V, Group VI or Group VII metals and (3) Group VIII metals, from aqueous or organic solutions containing compounds of such metals. In such method, the amount of the Group VIII metal hydroxide is typically in the range from 0.01 to 10.0 percent by weight of the total precipitated hydroxide. Mixtures of Group III and Group IV metal oxides or hydroxides, or of two or more from among Group V, Group VI and Group VII metal oxides or hydroxides, may be employed.

Solutions of metal compounds which can be used in the preparation of catalysts according to the invention, by impregnation or co-precipitation, are known in the art. For example, aqueous solution of chloroplatinic acid or tetra-ammine-platinum complex can be used to incorporate platinum, in the catalyst. Nitrates of iron and of manganese can be used for example to incorporate those metals in the catalyst. Solutions of zirconium oxychloride or of zirconyl nitrate can be used for example to prepare a zirconium support for the catalyst according to the invention. Various other solutions can be employed as needed.

Sulfate ion may be supplied to the catalyst according to the invention by treatment of the solid catalyst with sulfuric acid, for example 0.01–10N sulfuric acid, preferably 0.1–5N sulfuric acid. Other compounds such as ammonium sulfate capable of providing sulfate ion can be employed. Compounds such as hydrogen sulfide or sulfur dioxide or mercaptans, capable of forming sulfate ions upon calcining, can also be employed. Preferred catalysts for use according to the invention are those which have been sulfated with ammonium sulfate.

The catalysts according to the invention may contain substantial amounts of sulfate ion, preferably in amount of 0.5 to 20 weight percent based on total catalyst, and more preferably 5 to 15 weight percent.

The catalysts according to the invention may be calcined at a temperature which is preferably in the range from 450°–800° C., more preferably 550°–700° C., and for a period of time in the range from 2 to 30 hours. Combinations of temperature and time can be chosen in order to provide a desired degree of conversion. For example, calcining at 550° C. for 12 hours provides about the same initial conversion of n-butane to isobutane as calcining at 575° C. for 4 hours.

The catalysts according to the invention are in one embodiment of the invention used to isomerize normal alkanes having four to seven carbon atoms, namely butane, pentane, hexane and heptane, to convert the straight chain hydrocarbons into branched chain hydrocarbons having higher octane number for use as motor fuel or, as in the case of butane, having enhanced value as an intermediate for such products as tertiarybutyl alcohol and high octane alkylates.

The isomerization is carried out by contacting the hydrocarbon feed with the solid catalyst at temperatures in the range from 0° to 400° C. preferably in the range from 20° to 150° C. and at pressure in the range from 1 to 50 atmospheres. An advantage of the catalysts according to the invention is that they are capable of providing higher yields of desired product at a given temperature than the prior art catalysts, and it is therefore possible to obtain a given yield with the catalyst according to the invention at a lower temperature than that required with the prior art catalysts, and therefore with lesser heat requirements and expense. The catalysts according to the invention also exhibit a beneficial degree of sulfur tolerance. The isomerization may be conducted either in the presence or absence of hydrogen. If conducted in the presence of hydrogen, the mole ratio of hydrogen to hydrocarbon is preferably in the range from 0.1:1 to 10:1. Inert gas such as nitrogen, helium, or argon may be employed. Generally, a temperature is used which is sufficiently high to obtain a desired rate of reaction, but not so high as to result in unnecessarily great heat requirements.

The following examples illustrate the catalyst of the invention:

EXAMPLE 1

A sulfated zirconia based catalyst containing the Group VIII metal, iron, and the Group VII metal, manganese, is prepared by the following co-precipitation method:

Suitable amounts of zirconyl nitrate and ferric nitrate and manganese nitrate are dissolved in de-ionized water to make 1.0 liter of solution (A) of concentrations as hereinafter indicated. 130 grams of concentrated ammonium hydroxide are diluted with sufficient de-ionized water to make 1.0 liter of solution (B). 500 milliliters of de-ionized water are added to a 5 liter Morton flask. Solution (A) and solution (B) are added concurrently from two addition funnels to the Morton flask slowly with rapid stirring. The pH of the resulting reaction mixture is kept at about 7.0. The reaction slurry is filtered and the filter cake is washed with de-ionized water several times until the filtrate is nitrate free. The damp cake is applied to perforated plates, placed in a tray and dried overnight at 150° C. The pellets are removed from the tray, transferred to a porcelain dish and calcined in an oven at 500° C. for 4.0 hours. The calcined pellets are added slowly to a beaker containing 1.0 normal sulfuric acid solution at room temperature. The amount of sulfuric acid is determined by the following ratio of 15 milliliters of 1.0 normal sulfuric acid per gram of pellet. The sulfuric acid solution is decanted after the pellets are soaked for 2.0 hours. The pellets are calcined again at 500° C. for 4 hours.

EXAMPLES 2 TO 9

The catalysts prepared in Example 1 are used in isomerization of n-butane as follows: In a fixed bed reactor containing 5.0 milliliters of solid catalyst, n-butane (2.2 milliliters of liquid per hour) and nitrogen (30 milliliters per minute) are continuously added from the top of the reactor. The reaction temperature is controlled by an oil circulating heating jacket. The reaction pressure is controlled using a back pressure regulator. The reaction sample is taken from the bottom of the reactor (after the back pressure regulator) by withdrawing the gas mixture using a gas tight syringe. The degree of isomerization is determined on samples taken after two-hour reaction time, using a gas chromatograph equipped with a SE-30 capillary column. The results are shown in the following table:

TABLE 1

Isomerization of n-butane to isobutane (catalyst charge: 5.0 mililiters; n-butane feed; 2.2 mililiters of liquid per hour; nitrogen charge: 30 mililiters per minute).

| Example | Run No. | Catalyst | Isomerization Temperature °C. | Product Composition (% wt) | |
|---|---|---|---|---|---|
| | | | | Isobutane | n-butane |
| 2 | 1 | Neat $ZrO_2$ | 50 | 0.09 | 99.90 |
| | 2 | Neat $ZrO_2$ | 75 | 0.11 | 99.89 |
| | 3 | Neat $ZrO_2$ | 100 | 0.29 | 99.70 |
| 3 | 4 | 1.5% Ru on $ZrO_2$ | 50 | 0.62 | 99.27 |
| | 5 | 1.5% Ru on $ZrO_2$ | 75 | 3.40 | 95.98 |
| | 6 | 1.5% Ru on $ZrO_2$ | 100 | 4.55 | 94.94 |
| 4 | 7 | 1.5% Fe on $ZrO_2$ | 50 | 2.11 | 97.89 |
| | 8 | 1.5% Fe on $ZrO_2$ | 75 | 11.86 | 88.14 |
| | 9 | 1.5% Fe on $ZrO_2$ | 100 | 23.29 | 75.70 |
| 5 | 10 | 2.0% Fe on $ZrO_2$ | 50 | 2.26 | 97.74 |
| | 11 | 2.0% Fe on $ZrO_2$ | 75 | 10.09 | 89.91 |
| | 12 | 2.0% Fe on $ZrO_2$ | 100 | 18.36 | 81.12 |
| 6 | 13 | 1.5% Fe, 0.5% Mn on $ZrO_2$ | 23 | 2.37 | 97.62 |
| | 14 | 1.5% Fe, 0.5% Mn on $ZrO_2$ | 50 | 6.50 | 93.50 |
| | 15 | 1.5% Fe, 0.5% Mn on $ZrO_2$ | 100 | 24.58 | 74.39 |
| 7 | 16 | 1.0% Fe, 1.0% Mn on $ZrO_2$ | 23 | 4.07 | 95.93 |
| | 17 | 1.0% Fe, 1.0% Mn on $ZrO_2$ | 50 | 9.31 | 90.40 |
| | 18 | 1.0% Fe, 1.0% Mn on $ZrO_2$ | 75 | 11.20 | 88.51 |
| 8 | 19 | 0.5% Fe, 1.5% Mn on $ZrO_2$ | 23 | 1.47 | 98.53 |
| | 20 | 0.5% Fe, 1.5% Mn on $ZrO_2$ | 50 | 1.31 | 98.69 |
| | 21 | 0.5% Fe, 1.5% Mn on $ZrO_2$ | 75 | 0.88 | 99.12 |
| 9 | 22 | 3.75% Fe, 1.25% Mn on $ZrO_2$ | 23 | 4.58 | 95.42 |
| | 23 | 3.75% Fe, 1.25% Mn on $ZrO_2$ | 50 | 10.29 | 89.71 |
| | 24 | 3.75% Fe, 1.25% Mn on $ZrO_2$ | 75 | 15.0 | 85.0 |
| | 25 | 3.75% Fe, 1.25% Mn on $ZrO_2$ | 100 | 5.04 | 94.96 |

The catalyst used in Example 2 above was zirconium without added Group VIII metal. The catalyst used in Example 3 was zirconium with 1.5% added ruthenium, prepared as described in Example 1, but employing the Group VIII metal, ruthenium, in place of iron. The catalysts used in Examples 4 to 9 were zirconium with the indicated added amounts of iron, or of iron and manganese, prepared as described in Example 1. All of the catalysts in Examples 2 to 9 were sulfated and calcined as described in Example 1.

The following table presents data from the above Table 1 to show the effect of varying catalyst composition on the isomerization results at a given temperature:

| Run No. | Catalyst | Isomeriz. Temp. °C. | Isobutane % in Isomerization Prod. |
|---|---|---|---|
| 11 | 2.0% Fe on $ZrO_2$ | 75 | 10.09 |
| 12 | 2.0% Fe on $ZrO_2$ | 100 | 18.36 |
| 15 | 1.5% Fe, 0.5% Mn on $ZrO_2$ | 100 | 24.58 |
| 18 | 1.0% Fe, 1.0% Mn on $ZrO_2$ | 75 | 11.20 |
| 21 | 0.5% Fe, 1.5% Mn on $ZrO_2$ | 75 | 0.88 |
| 24 | 3.75% Fe, 1.25% Mn on $ZrO_2$ | 75 | 15.00 |
| 25 | 3.75% Fe, 1.25% Mn on $ZrO_2$ | 100 | 5.04 |

Comparison of Runs 12 and 15 shows the increase in isomerization activity by using Group VIII and Group VII metals together, in place of the same total amount of Group VIII metal. The acid strength $H_o$ of the catalyst of Run 12 is believed to be about −18. The acid strength $H_o$ of the catalyst of Run 15 is believed to be less than −18. Runs 18 and 21 show the effect of varying the ratio of Group VIII metal to Group VII metal in the catalyst, and shows that unsatisfactory results are obtained when the ratio is 1:3. The ratio of Group VIII metal to Group VII metal may be about 1 to 1 (as in Run 18) or somewhat lower with satisfactory results, but a ratio higher than 1 to 1 is preferred. Comparisons of Runs 15 and 25 show that, at a ratio of Group VIII metal to Group VII metal of 3 to 1, better results are obtained with total amount of Group VIII and Group VII metal of 2.0 than with total amount of Group VIII and Group VII metal of 5.0.

The above examples 1 to 9 are the same as examples 1 to 9 of our U.S. Pat. Nos. 4,918,041 and 4,956,919. Examples 10–16 of said patents are hereby incorporated in this application by reference.

Other suitable embodiments of the invention are obtained when other elements, or mixtures thereof, from Group III or Group IV are used in place of zirconium, when other metals or mixtures thereof from Group V, Group VI or Group VII are used in place of manganese, and when other Group VIII metals are used in place of iron.

The invention claimed is:

1. Solid superacid catalyst having acid strength $H_o$ less than −18 and comprising Group VII metal or compounds thereof.

2. Catalyst of claim 1 wherein said Group VII metal comprises manganese.

* * * * *